United States Patent
Nakamura et al.

(10) Patent No.: US 9,472,940 B2
(45) Date of Patent: Oct. 18, 2016

(54) PROTECTION DEVICE FOR ELECTRICITY SUPPLY CIRCUIT

(71) Applicant: YAZAKI CORPORATION, Minato-ku, Tokyo (JP)

(72) Inventors: Yoshihide Nakamura, Shizuoka (JP); Akinori Maruyama, Shizuoka (JP); Yoshinori Ikuta, Shizuoka (JP); Keisuke Ueta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 77 days.

(21) Appl. No.: 14/510,651

(22) Filed: Oct. 9, 2014

(65) Prior Publication Data

US 2015/0022930 A1 Jan. 22, 2015

Related U.S. Application Data

(63) Continuation of application No. PCT/JP2013/054122, filed on Feb. 20, 2013.

(30) Foreign Application Priority Data

Apr. 24, 2012 (JP) ................................ 2012-098894

(51) Int. Cl.
*H02H 3/093* (2006.01)
*H02H 3/06* (2006.01)
(Continued)

(52) U.S. Cl.
CPC .............. *H02H 3/0935* (2013.01); *H02H 3/06* (2013.01); *H02H 3/085* (2013.01); *H02H 6/00* (2013.01)

(58) Field of Classification Search
CPC .......... H02H 3/08; H02H 3/085; H02H 5/04; H02H 5/041; H02H 3/06; H02H 3/093; H02H 3/0935

USPC ........................................................ 361/93.1
See application file for complete search history.

(56) References Cited

U.S. PATENT DOCUMENTS 4,896,254 A * 1/1990 Bennett .................... H02H 3/06
307/18
5,388,022 A * 2/1995 Ahuja ....................... H02H 3/06
361/111

(Continued)

FOREIGN PATENT DOCUMENTS

JP  H09-244115 A  9/1997
JP  2007-174490 A  7/2007

(Continued)

OTHER PUBLICATIONS

Extended European search report issued on Jan. 27, 2016 in the counterpart European patent application.

(Continued)

*Primary Examiner* — Stephen W Jackson
*Assistant Examiner* — Christopher Clark
(74) *Attorney, Agent, or Firm* — Mots Law, PLLC

(57) ABSTRACT

When a power switch is turned off, a protection device for an electricity supply circuit starts keeping time using a timer and turns on a disconnection flag. Then the protection device turns off the disconnection flag when the timer has counted a predetermined time. When the power switch is turned off, the disconnection flag does not subsequently turn off until the predetermined time has passed. Therefore, it is possible to prevent an excessive temperature increase in the power switch and prevent damage to the power switch.

15 Claims, 3 Drawing Sheets

(51) Int. Cl.
*H02H 6/00* (2006.01)
*H02H 3/08* (2006.01)

(56) References Cited

U.S. PATENT DOCUMENTS

| | | | | |
|---|---|---|---|---|
| 5,440,441 A * | 8/1995 | Ahuja | ............... | H02H 3/06 361/62 |
| 5,453,904 A * | 9/1995 | Higashiyama | ......... | H02H 3/093 323/276 |
| 5,877,604 A * | 3/1999 | Kessler | ............... | H02H 7/0833 318/434 |
| 6,232,875 B1 * | 5/2001 | DeZorzi | ............ | B60C 23/0408 116/34 R |
| 8,432,657 B2 * | 4/2013 | Nakamura | ............ | H02H 6/005 361/101 |
| 9,083,179 B2 * | 7/2015 | Ikuta | ............... | H02H 3/085 |
| 2007/0103820 A1 * | 5/2007 | Kobayashi | ............ | H02P 29/00 361/25 |
| 2007/0146951 A1 * | 6/2007 | Takahashi | ............ | H02H 3/087 361/93.1 |
| 2007/0253132 A1 * | 11/2007 | Nakamura | ............ | H02H 6/005 361/103 |
| 2010/0254059 A1 * | 10/2010 | Higuchi | ............ | G01K 3/005 361/103 |
| 2011/0019324 A1 * | 1/2011 | Nakamura | ............ | H02H 6/005 361/93.8 |
| 2011/0080681 A1 * | 4/2011 | Maruyama | ............ | H02H 6/005 361/93.8 |
| 2012/0022708 A1 * | 1/2012 | Higuchi | ............ | H02J 7/0031 700/293 |
| 2013/0103900 A1 * | 4/2013 | Chiu | ............ | G06F 11/004 711/112 |
| 2013/0114307 A1 * | 5/2013 | Fang | ............ | H02M 1/32 363/21.01 |
| 2014/0340803 A1 * | 11/2014 | Pasqualetto | ......... | H02H 7/0838 361/103 |

FOREIGN PATENT DOCUMENTS

| | | |
|---|---|---|
| JP | 2009-130944 A | 6/2009 |
| JP | 2010-166752 A | 7/2010 |
| JP | 2010-239835 A | 10/2010 |
| JP | 2011-072133 A | 4/2011 |

OTHER PUBLICATIONS

Japanese office action letter issued on Nov. 24, 2015 in the counterpart Japanese patent application.

* cited by examiner

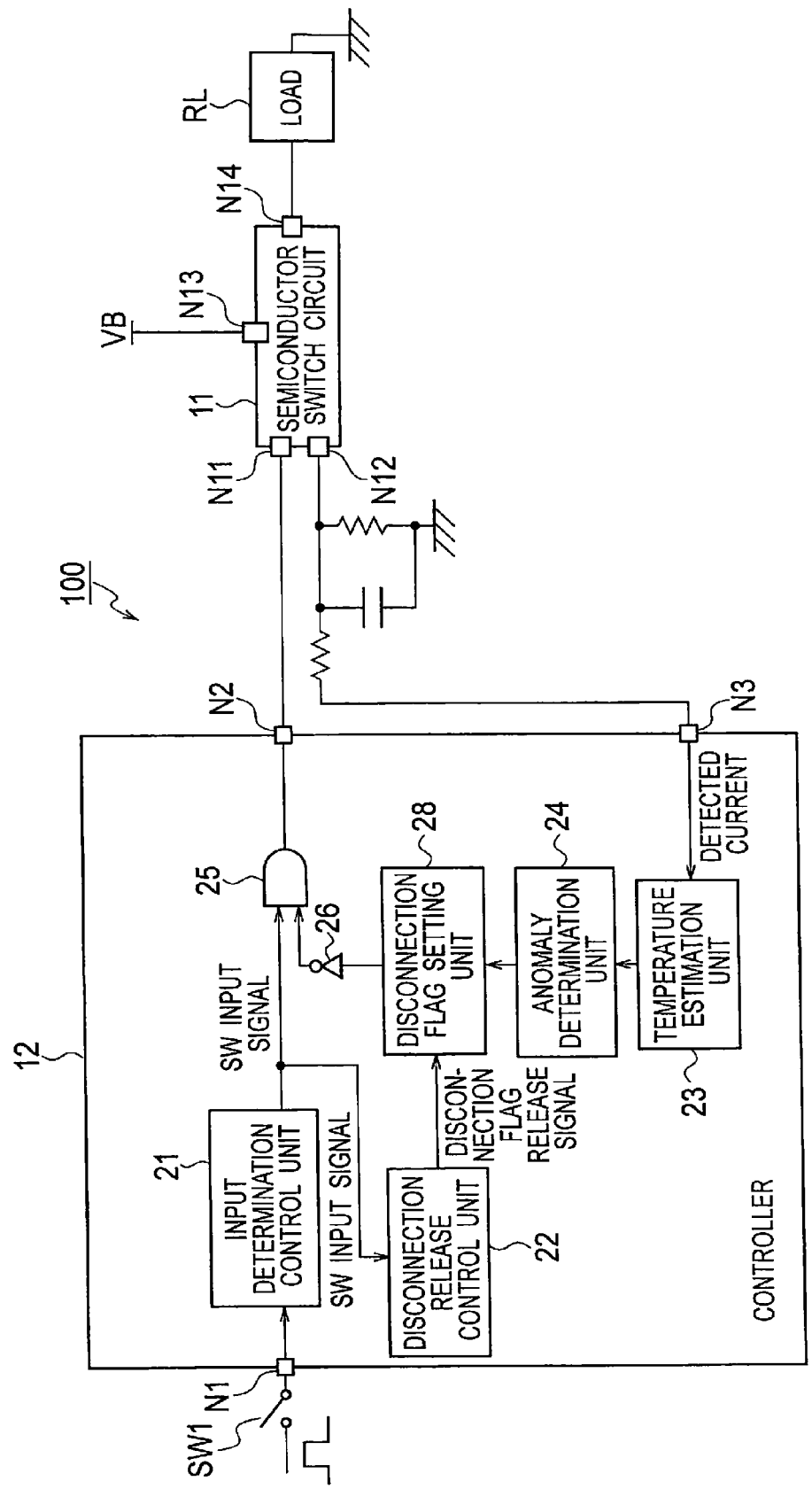

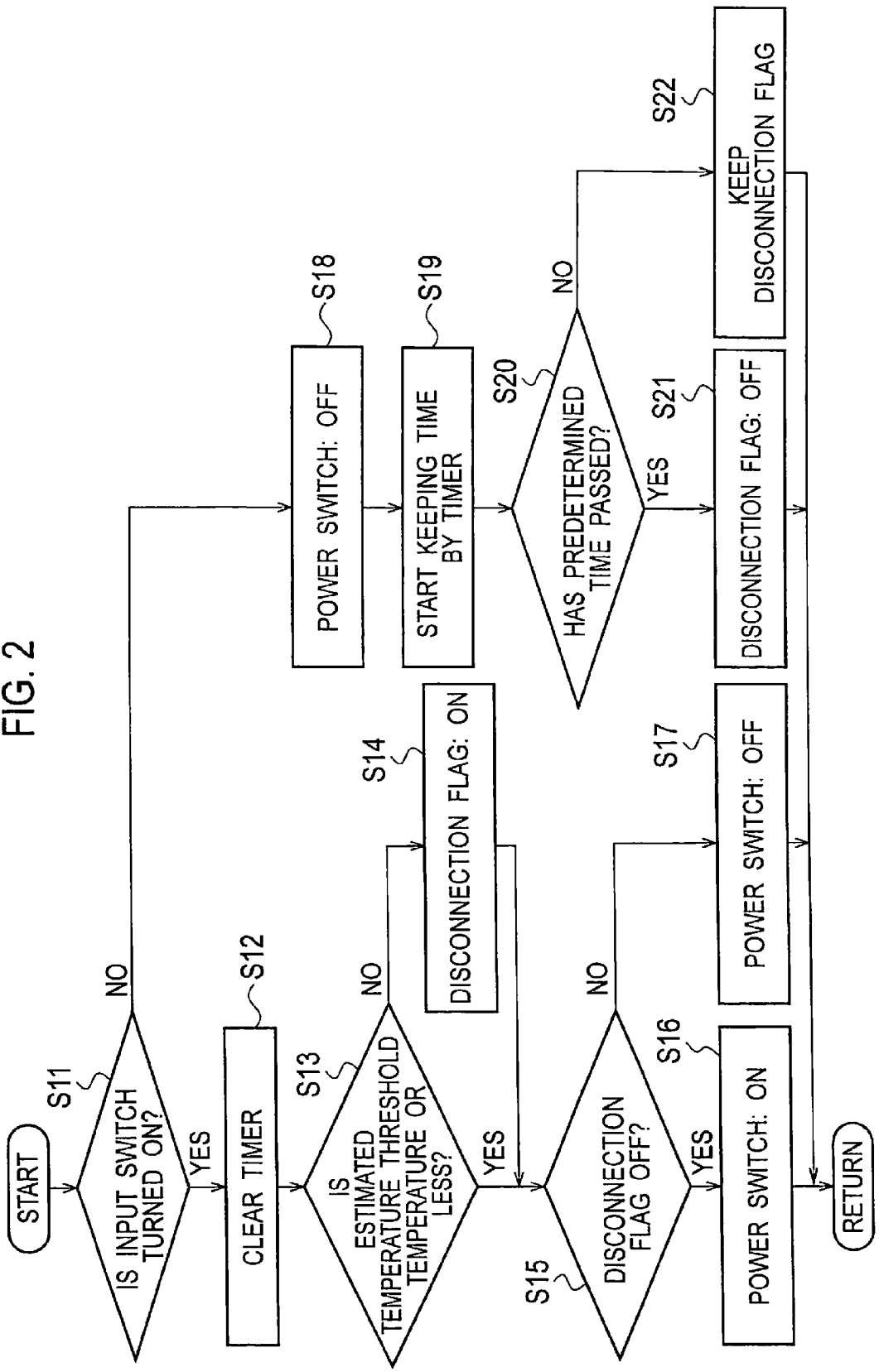

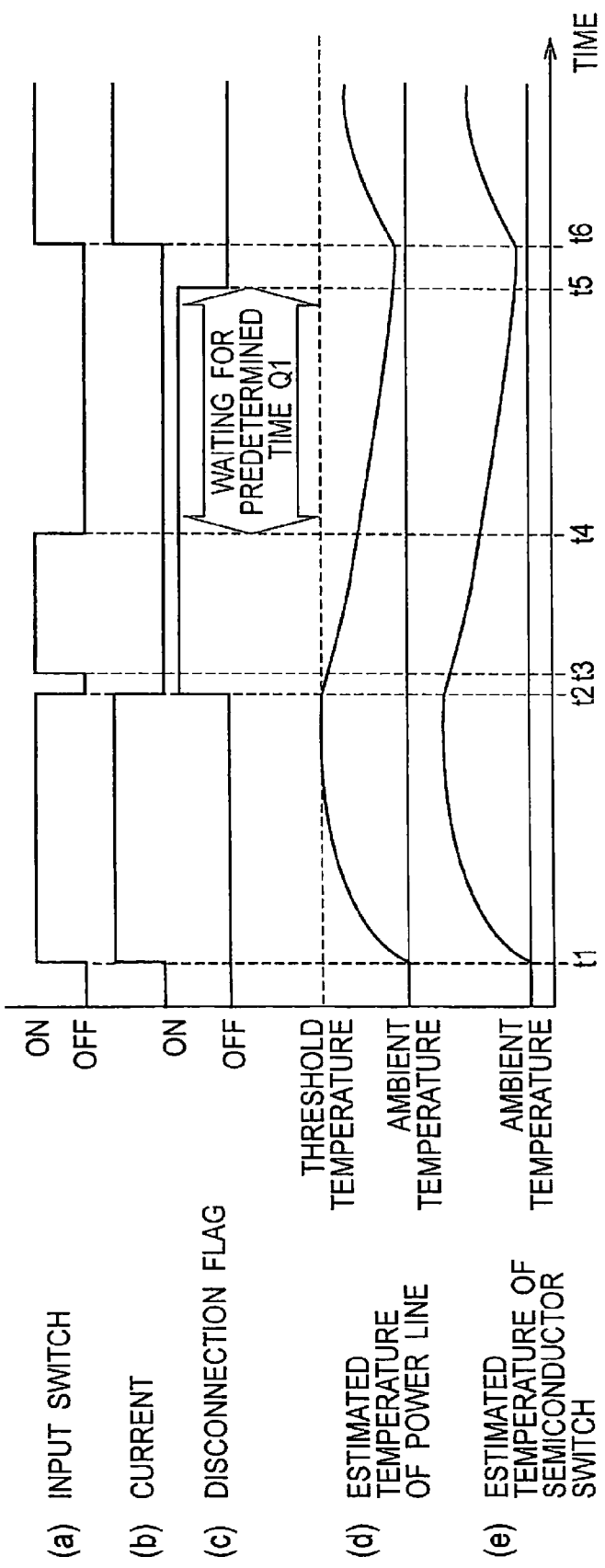

PROTECTION DEVICE FOR ELECTRICITY SUPPLY CIRCUIT

CROSS REFERENCE TO RELATED APPLICATION

This application is a continuation of International Application No. PCT/JP2013/054122, filed Feb. 20, 2013, and based upon and claims the benefit of priority from Japanese Patent Application No. 2012-098894, filed Apr. 24, 2012, the entire contents of all of which are incorporated herein by reference.

BACKGROUND

1. Technical Field

The present application relates to a protection device for an electricity supply circuit for supplying a load with electricity, which immediately disconnects the circuit to protect the electricity supply circuit and the load when an overcurrent flows to the electricity supply circuit.

2. Related Art

For instance, a controller for controlling a load installed on a vehicle is equipped with a protection circuit that immediately disconnects a circuit when an overcurrent flows to the load. As a conventional example of such a protection circuit, there is known a protection circuit described in JP 2009-130944 A (PTL 1). In PTL 1, the quantities of heat generation and heat radiation of an electricity supply circuit (including a power line connecting a load with a power supply, and a power switch) are calculated on the basis of a current value flowing to the load and furthermore, the temperature of the electricity supply circuit is estimated upon measuring the ambient temperature. Then, if the estimated temperature reaches a predetermined threshold value, the controller disconnects the electricity supply circuit to protect a circuit connected to the load.

SUMMARY

In the conventional example disclosed in PTL 1, although there is a description of estimating the temperature of the electricity supply circuit and further disconnecting the electricity supply circuit if the estimated temperature reaches the predetermined threshold value, there is no description about a method of releasing the disconnection after the circuit was disconnected. Thus, it is unclear how the power line or the semiconductor (power) switch is turned on again, causing a problem that, according to the circumstances, the temperature of the electricity supply circuit may rise abnormally since the semiconductor switch was turned on again.

In order to solve such a conventional problem, therefore, the present invention is intended to provide a protection device for an electricity supply circuit, which is capable of turning on a power switch safely after the power switch was disconnected.

To this end, according to a first aspect of the present invention, there is provided a protection device for an electricity supply circuit, which disconnects the electricity supply circuit when an overcurrent flows to the electricity supply circuit connected to a load, thereby to protect the electricity supply circuit. The protection device includes: a power switch that switches between conduction and disconnection of the electricity supply circuit; and a controller configured to output a switching command signal to the power switch in accordance with an operating signal through an input switch. The controller includes: a timer that, when the power switch is turned off, counts an elapsed time since the power switch has been turned off; a disconnection flag setting unit configured to turn on a disconnection flag when the electricity supply circuit is turned off by anomaly, and turn off the disconnection flag when a disconnection flag release signal is inputted; and a disconnection release control unit configured to output the disconnection flag release signal to the disconnection flag setting unit when the timer has counted a predetermined time. During the disconnection flag is turned on, the controller is configured to control the power switch so that the power switch would be maintained in an OFF state even if the input switch is turned on.

It is preferable that when the input switch is turned on, the timer resets the elapsed time being counted.

It is preferable that the protection device for the electricity supply circuit further includes a current detector for detecting current flowing to the electricity supply circuit. Preferably, the controller includes: a temperature estimation unit that, when the electricity supply circuit is turned on, estimates an increasing temperature of the electricity supply circuit based on a current value detected by the current detector and an electricity supply time, and when the electricity supply circuit is turned off, estimates a decreasing temperature of the electricity supply circuit based on the elapsed time, and that estimates a temperature of the electricity supply circuit based on the increasing temperature and the decreasing temperature; and an anomaly determination unit that judges whether or not the temperature of the electricity supply circuit estimated by the temperature estimation unit exceeds a predetermined temperature. It is preferable that the disconnection flag setting unit turns on the disconnection flag when the anomaly determination unit judges that the temperature of the electricity supply circuit has exceeded the predetermined temperature.

In protection device for the electricity supply circuit according to the first aspect of the present invention, the disconnection flag is turned on when the power switch is turned off by anomaly, and the disconnection flag is turned off after a predetermined time has passed. Therefore, under condition that the power switch is turned off, it is prohibited to turn on the power switch again within the predetermined time. As a result, it is possible to prevent the power switch from being turned on immediately after the power switch is turned off, thereby preventing damage to the power switch.

BRIEF DESCRIPTION OF DRAWINGS

FIG. 1 is a block diagram illustrating the constitution of a load drive apparatus equipped with a protection device for an electricity supply circuit according to an embodiment.

FIG. 2 is a flow chart illustrating the processing operation of the protection device for the electricity supply circuit according to the embodiment.

FIG. 3 is a timing chart illustrating the change of respective signals of the protection device for the electricity supply circuit according to the embodiment.

DETAILED DESCRIPTION

An embodiment will be described with reference to drawings, below.

[Explanation of Constitution]

As illustrated in FIG. 1, a load driving apparatus 100, which is equipped with a protection device for an electricity supply circuit according to the embodiment, includes a load RL, such as a lamp and a motor mounted on a vehicle, a semiconductor switch circuit 11 as a power switch that switches between driving and stop of the load RL, and a controller 12 for controlling the semiconductor switch circuit 11.

The semiconductor switch circuit 11 is arranged between a power supply VB and the load RL to switch between driving and stop of the load RL in response to an operation command signal outputted from the controller 12. The semiconductor switch circuit 11 has a function as a current detector for detecting current flowing to the load RL. Specifically, when a terminal N11 inputs the operation command signal, the semiconductor switch circuit 11 turns on the power switch to make electrical conduction between terminals N13 and N14, supplying the load RL with current for driving the load RL. Additionally, the semiconductor switch circuit 11 outputs a current detection signal from a terminal N12. The semiconductor switch circuit 11 may be comprised of for example, IPS (Intelligent Power Switch) or a combination of a MOSFET and a shunt resistor.

The controller 12 includes an input determination control unit 21, a disconnection release control unit 22, a temperature estimation unit 23, an anomaly determination unit 24, an AND gate 25, an inverter 26, a disconnection flag setting unit 28, and terminals N1, N2, and N3 for connection with external equipment.

The input determination control unit 21 is connected to an operation switch SW1 through the terminal N1. When inputting an OFF command or an ON command by the operation switch SW1, the input determination control unit 21 outputs a switch input signal based on these commands to the AND gate 25 and the disconnection release control unit 22.

The temperature estimation unit 23 is connected to the terminal N3. The terminal N3 is connected to the terminal N12 of the semiconductor switch circuit 11 via a resistor. The temperature estimation unit 23 acquires a current detection signal flowing to the semiconductor switch circuit 11 through the terminal N3, calculates the quantities of heat generation and heat radiation of a power line constituting the electricity supply circuit, based on current value flowing to the semiconductor switch circuit 11, and further estimates temperature of the power line constituting the electricity supply circuit, based on the characteristics of the power line, such as its thermal resistance and heat capacity. Note, a method of estimating the temperature of the power line by the temperature estimation unit 23 will be described later.

Based on the power line temperature estimated by the temperature estimation unit 23, the anomaly determination unit 24 outputs a command to turn on a disconnection flag to the disconnection flag setting unit 28 when the power line temperature reaches a predetermined threshold temperature.

The timer control unit 22 includes a timer for counting time. The timer control unit 22 activates the timer when a switch input signal representing the OFF command is outputted from the input determination control unit 21 to count an elapsed time since the OFF-command signal is inputted. That is, when the timer has counted a predetermined time, the disconnection release control unit 22 outputs a disconnection flag release signal to the disconnection flag setting unit 28. Additionally, when a switch input signal representing the ON command is inputted through the input determination control unit 21 under condition that the disconnection flag is set, the disconnection release control unit 22 resets the timer. Thus, time keeping using the timer is started over with a clean state.

The disconnection flag setting unit 28 turns on the disconnection flag when the ON command of the disconnection flag is outputted from the anomaly determination unit 24, and turns off the disconnection flag when the disconnection flag release signal is outputted from the disconnection release control unit 22. Then, the disconnection flag setting unit 28 outputs an "H" signal to the inverter 26 when the disconnection flag is turned on, and also outputs an "L" signal to the inverter 26 when the disconnection flag is turned off. The inverter 26 inverts the inputted signal and outputs it.

One input terminal of the AND gate 25 is connected to an output terminal of the input determination control unit 21. The other input terminal of the AND gate 25 is connected to an output terminal of the inverter 26. When both the output signal of the input determination control unit 21 and the output signal of the inverter 26 are signals at the "H" level together, the AND gate 25 outputs a signal at the "H" level through the terminal N2. When the output signal of the AND gate 25 becomes the "H" level, the semiconductor switch circuit 11 is turned on, so that the load RL is supplied with electricity.

[Description of Estimation Process of Power Line Temperature]

Next, the process of estimating the temperature of the power line by the temperature estimation unit 24 will be described. First, the calculation of rising temperature is described. The quantity of heat X1 [J] of power line accompanied with heat generation caused by current flowing to the power line connected to the load RL can be represented by the following equation (1), $$X1 = i^2 \times Ron \times \Delta t \quad (1)$$

where, i is current [A], Ron is resistance [Ω] of a conductor, and Δt is sampling time [sec].

Therefore, present estimated temperature T1 [° C.] of the power line can be calculated by adding temperature (rising temperature) [° C.], which is obtained by dividing the quantity of heat X1 [J] by heat capacity [J/° C.], to a previous detection temperature [° C.] (initially, ambient temperature).

Next, the calculation of lowering temperature will be described. The quantity of heat radiation Y1 [J] accompanied with heat radiation under condition that no current is detected by the semiconductor switch circuit 11 can be represented by the following equation (2), $$Y1 = Q/(Cth \times Rth/\Delta t) \quad (2)$$

where, Q is heat quantity of the power line [J], Cth is heat capacity of the power line [J/° C.], Rth is thermal resistance of the power line [° C./W], and Δt is sampling time [sec]. Then, the present estimated temperature T1 [° C.] of the power line can be calculated by subtracting temperature (lowering temperature) [° C.], which is obtained by dividing the quantity of heat radiation Y1 [J] by the heat capacity [J/° C.] from temperature [° C.] at a previous detection.

[Explanation of Operation]

Next, the operation of the protection device for the electricity supply circuit according to the embodiment will be described with reference to a flow chart illustrated in FIG. 2 and a timing chart illustrated in FIG. 3.

Here, it is described the processing in a case where the semiconductor switch circuit 11 is disconnected. In this case, as mentioned above, the semiconductor switch circuit 11 is disconnected at the time of turning on the disconnection flag. Additionally, when it is judged that the input switch SW1 is turned off, the timer is activated to count an elapsed time since the disconnection started.

At step S11 in FIG. 2, the disconnection release control unit 22 judges whether or not the input switch SW1 has been turned on. That is, it is executed to judge whether or not the operation for an operator to turn on the input switch SW 1 again is performed after the power supply was disconnected. Then, if the input switch has been turned on, the timer is cleared at step S12.

Next, at step S13, the anomaly determination unit 24 judges whether or not the power line temperature estimated by the temperature estimation unit 23 is the predetermined threshold temperature or less. Then, if it is judged that the power line temperature is not the predetermined threshold temperature or less (NO at step S13), the processing goes to step S14 to output the ON command for the disconnection flag since the power line temperature is not so much lowered as the semiconductor switch circuit 11 could be turned on. As a result, the disconnection flag is turned on by the disconnection flag setting unit 28. Subsequently, the processing goes to step S15.

If the power line temperature is the threshold temperature or less (YES at step S13) or when the processing at step S14 is completed, it is executed at step S15 to judge whether or not the disconnection flag is turned off. Then, if the disconnection flag is turned off, the semiconductor switch circuit 11 is turned on to drive the load RL at step S16. Here, as described above, by reason that the disconnection flag is turned off when the timer 22, which has been operated after the semiconductor switch circuit 11 was turned off, has counted the predetermined time, such a situation as it realizes the judgment of "YES" at step S15 means that the estimated temperature of the power line falls below the predetermined threshold temperature and the predetermined time has passed since the semiconductor switch circuit 11 was turned of That is, it is not until these conditions are established that it becomes possible to turn on the semiconductor switch circuit 11.

In a case where the disconnection flag is turned off (NO at step S15), the semiconductor switch circuit 11 is turned off. That is, under condition that the disconnection flag is turned on, the semiconductor switch circuit 11 would be maintained in its OFF state even if the input switch SW1 is turned on.

On the other hand, if it is judged at the processing of step S11 that the input switch SW1 is turned off, the semiconductor switch circuit 11 is turned off at step S18. Next, at step S19, the disconnection release control unit 22 operates the timer to count the elapsed time since the semiconductor switch circuit 11 was disconnected.

At step S20, the disconnection release control unit 22 judges whether or not the predetermined time has been counted by the timer. Then, if the predetermined time has passed, the disconnection flag is tuned off at step S21. If the predetermined time has not passed yet, the disconnection flag is tuned on at step S22. That is, it is permitted to turn on the semiconductor switch circuit 11 only when the predetermined time has passed. Subsequently, the present processing is ended.

Next, specific change of signals will be described with reference to the timing chart illustrated in FIG. 3. In FIG. 3, (a) illustrates the operating state of the input switch SW1, (b) illustrates the supply and stop of current, (c) illustrates ON and OFF of the disconnection flag, (d) illustrates the estimated temperature of the power line, and (e) illustrates the estimated temperature of the power switch provided in the semiconductor switch circuit 11.

When the input switch SW1 is turned on at time t1 of FIG. 3, the ON command signal is inputted through the terminal N1 of FIG. 1. On receipt of this ON command signal, the input determination control unit 21 supplies one input terminal of the AND gate 25 with a switch input signal representing the ON command. Meanwhile, as the disconnection flag at the disconnection flag setting unit 28 is turned off at the normal operation, its output signal becomes a signal at the "L" level. This output signal is then inverted and supplied to the other input terminal of the AND gate 25. Thus, the output signal of the AND gate 25 becomes a signal at the level of "H", so that the signal at the "H" level is outputted from the terminal N2. Then, this signal is supplied to the terminal N11 of the semiconductor switch circuit 11.

Thus, the semiconductor switch circuit 11 turns on the power switch and supplies the load RL with electricity generated from the power supply VB. Consequently, as illustrated with (b) of FIG. 3, current flows to the load RL, allowing the load RL to be driven. At this time, as illustrated with (c) of FIG. 3, the disconnection flag is maintained in the OFF condition.

Also, the temperature estimation unit 23 calculates the estimated temperature T1 of the power line constituting the electricity supply circuit, based in the above-mentioned equations (1) and (2). Thus, the estimated temperature T1 of the power line changes so as to gradually increase, as illustrated with (d) of FIG. 3. Similarly, the temperature of the semiconductor switch gradually increases with the supply of current, as illustrated with (e) of FIG. 3.

Then, when the estimated temperature T1 of the power line reaches the predetermined threshold temperature at time t2, the anomaly determination unit 24 detects a temperature anomaly and outputs the ON command signal of the disconnection flag. Correspondingly, the disconnection flag setting unit 28 turns on the disconnection flag. Consequently, as the output signal of the AND gate 25 is altered from the "H" level to the "L" level, the semiconductor switch circuit 11 is turned off to stop the power supply to the load RL.

Then, upon judging that the input switch SW1 is turned off, the disconnection release control unit 22 starts keeping time using the timer. Suppose, after that, the input switch SW1 is turned on at time t3. In this case, as the timer has not counted the predetermined time at this time, the disconnection flag is maintained in the ON state. Thus, at this time, there is no possibility that the power switch of the semiconductor switch circuit 11 turns on. In other words, in a situation where the semiconductor switch circuit 11 is disconnected at time t2 and thereafter, an operator turns on the input switch SW1 at time 3, the power switch of the semiconductor switch circuit 11 does not turn on since the disconnection flag is turned on, so that the load RL is not driven (see step S17 of FIG. 2).

Thereafter, if the input switch SW1 is turned off at time t4, then the timer is activated at time t4 to count an elapsed time since the input switch SW1 was turned off. Then, the disconnection release flag is turned off at time t5 when the predetermined time Q1 has passed since time t4 (see step S21 of FIG. 2).

Suppose, thereafter, the input switch SW1 is turned on at time t6. Then, as the disconnection flag is turned off, turning on of the semiconductor switch circuit 11 allows the load RL to be driven (see step S16 of FIG. 2). Accordingly, the operation of the protection device for the electricity supply circuit can be controlled so that: when the semiconductor switch circuit 11 is turned off, the disconnection flag is turned on and the timer is started; and when the timer has counted the predetermined time, the disconnection flag is turned off to allow the load RL to be driven.

[Explanation of Effects]

In this way, according to the protection device for the electricity supply circuit according to the embodiment, under the condition that the semiconductor switch circuit 11 is changed from the ON state to the OFF state, the disconnection flag keeps to turn on until a predetermined time has passed after the semiconductor switch circuit 11 is turned off. In such a situation, the semiconductor switch 11 circuit could not be tuned on again. Thus, by turning on the disconnection flag for a predetermined time irrespective of an estimated temperature of the power line after the semiconductor switch circuit 11 was disconnected, the semiconductor switch circuit 11 is prohibited from being turned on again even when an operator turns on the input switch SW1. Therefore, it is possible to avoid an occurrence of such a problem that the semiconductor switch circuit 11 is damaged with increasing temperature.

Additionally, it is possible to prevent the semiconductor switch circuit 11, which is under the condition that it has been turned off, from being undesirably restarted by the influence of noise etc., enabling a prevention of malfunction caused by noise etc.

Moreover, as the protection device is configured so as to reset keeping time using the timer if the ON command signal is inputted during the timer's operation, the disconnection flag can be released by certainly counting the predetermined time after the semiconductor switch circuit 11 was disconnected.

Although the protection device for the electricity supply circuit according to the embodiment of the present invention has been described with reference to the accompanying drawings hereinbefore, the present invention is not limited to this embodiment only and therefore, the constitution of each unit may be replaced with any given constitution.

For instance, although the above-mentioned embodiment is directed to an example of controlling driving and stop of a load mounted on a vehicle, the present invention is not limited only to this embodiment; it is also applicable to other loads.

What is claimed is:

1. A protection device for an electricity supply circuit, which is configured to disconnect the electricity supply circuit when an overcurrent flows to the electricity supply circuit connected to a load, thereby to protect the electricity supply circuit, the protection device comprising:
   a power switch that switches between conduction and disconnection of the electricity supply circuit; and
   a controller configured to output a switching command signal to the power switch in accordance with an operating signal through an input switch,
   the controller comprising:
   a timer that, when the input switch is turned off, counts an elapsed time since the power switch has been turned off;
   a disconnection flag setting unit configured to turn on a disconnection flag when an anomaly in the electricity supply circuit is detected, and turn off the disconnection flag when a disconnection flag release signal is inputted; and
   a disconnection release control unit configured to output the disconnection flag release signal to the disconnection flag setting unit when the timer has counted a predetermined time that is set for a time required to lower an estimated temperature of the electricity supply circuit, wherein
   during a period that the disconnection flag is turned on, the controller is configured to control the power switch so that the power switch would be maintained in an OFF state even if the input switch is turned on.

2. The protection device of claim 1, wherein the timer is configured to reset the elapsed time being counted when the input switch is turned on.

3. The protection device of claim 1, further comprising a current detector for detecting current flowing to the electricity supply circuit, wherein
   the controller comprises:
   a temperature estimation unit that, when the power switch is turned on, estimates an increasing temperature of the electricity supply circuit based on a current value detected by the current detector and an electricity supply time, and when the power switch is turned off, estimates a decreasing temperature of the electricity supply circuit based on the elapsed time, and that estimates a temperature of the electricity supply circuit based on the increasing temperature and the decreasing temperature; and
   an anomaly determination unit that judges whether or not the estimated temperature of the electricity supply circuit estimated by the temperature estimation unit exceeds a predetermined temperature, and
   the disconnection flag setting unit turns on the disconnection flag when the anomaly determination unit judges that the temperature of the electricity supply circuit has exceeded the predetermined temperature.

4. The protection device of claim 3, wherein:
   the temperature estimation unit estimates the increasing temperature of the electricity supply circuit according to expression (1):

$$X1 = i^2 \times R_{on} \times \Delta t \quad (1);$$

where, i is the current value, $R_{on}$ is resistance of the electrical supply circuit connected to the load, and $\Delta t$, is a sampling time in seconds; and
   the estimated temperature of the electricity supply circuit for a present time period is calculated by adding the estimated rising temperature obtained by dividing the quantity of heat X1 calculated from the expression (1) by a heat capacity of the electricity supply circuit, to an estimated temperature calculated from a previous time period.

5. The protection device of claim 4, wherein:
   the temperature estimation unit estimates the decreasing temperature of the electricity supply circuit according to expression (2):

$$Y1 = Q/(C_{th} \times R_{th}/\Delta t) \quad (2);$$

where, Q is heat quantity of the of the electrical supply circuit, $C_{th}$ is heat capacity of the electricity supply circuit, $R_{th}$ is thermal resistance of the electricity supply circuit;
   the estimated temperature of the electrical supply circuit for the present time period is calculated by subtracting the estimated decreasing temperature obtained by dividing the quantity of heat radiation Y1, calculated from the expression (2) by the heat capacity of the electricity supply circuit, from an estimated temperature calculated for the previous time period.

6. The protection device of claim 1, wherein the controller comprises:
   an input determination control unit;
   a disconnection release control unit;
   a temperature estimation unit;
   an anomaly determination unit;
   an AND gate;

an inverter;
a disconnection flag setting unit; and
terminals for connection with external equipment.

7. The protection device of claim 6, wherein:
the input determination control unit is connected to the input switch through one of the terminals; and
the input determination control unit outputs a switch input signal to the AND gate and the disconnection release control unit when the input switch inputs an OFF command or an ON command.

8. The protection device of claim 7, wherein the temperature estimation unit acquires a current detection signal from the power switch through one of the terminals, calculates, based on a current value associated with the current detection signal, a heat generation quantity and a heat radiation quantity of a power line constituting the electricity supply circuit, and estimates a temperature of the power line constituting the electricity supply circuit, based on one or more of a thermal resistance and a heat capacity of the power line.

9. The protection device of claim 8, wherein the anomaly determination unit outputs a command to turn on a disconnection flag to the disconnection flag setting unit when the estimated power line temperature reaches a predetermined threshold temperature.

10. The protection device of claim 7, wherein:
the timer is activated when a switch input signal representing the OFF command is outputted from the input determination control unit to count the elapsed time since the OFF-command signal is inputted;
when the timer has counted the predetermined time, the disconnection release control unit outputs the disconnection flag release signal to the disconnection flag setting unit; and
when a switch input signal representing the ON command is outputted from the input determination control unit to the disconnection release control unit in a condition in which the disconnection flag is on, the disconnection release control unit resets the timer.

11. The protection device of claim 10, wherein:
the disconnection flag setting unit turns on the disconnection flag when an ON command is outputted from the anomaly detection unit to the disconnection flag setting unit;
the disconnection flag setting unit turns off the disconnection flag when the disconnection flag release signal is outputted from the disconnection release control unit to the disconnection flag setting unit;
the disconnection flag setting unit outputs a logic high (H) signal to the inverter when the disconnection flag is turned on, and outputs a logic low (L) signal to the inverter when the disconnection flag is turned off; and
the inverter inverts and outputs the signal output from the disconnection flag setting unit.

12. The protection device of claim 11, wherein:
one input terminal of the AND gate is connected to an output terminal of the input determination control unit and the other input terminal of the AND gate is connected to an output terminal of the inverter;
when the output signal of the input determination control unit is a logic high (H) signal and the output signal of the inverter is the H signal, the AND gate outputs a logic high (H) signal through one of the terminals; and
the power switch is turned on so that the load is supplied with electricity.

13. The protection device of claim 1, wherein the load comprises one of: a vehicle-mounted lamp; and a vehicle-mounted motor.

14. The protection device of claim 1, wherein the power switch comprises a semiconductor switch circuit.

15. The protection device of claim 14, wherein the semiconductor switch circuit comprises an Intelligent Power Switch, or a combination of a MOSFET and a shunt resistor.

* * * * *